United States Patent
Catelani et al.

(10) Patent No.: US 7,593,825 B2
(45) Date of Patent: Sep. 22, 2009

(54) METHOD AND APPARATUS FOR MANAGEMENT OF CALIBRATION DATA

(75) Inventors: Mark Paul Catelani, Windsor, CA (US); Ryan Victor Columbus, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 20 days.

(21) Appl. No.: 10/925,776

(22) Filed: Aug. 25, 2004

(65) Prior Publication Data

US 2006/0047455 A1 Mar. 2, 2006

(51) Int. Cl.
*G06F 19/00* (2006.01)

(52) U.S. Cl. ........................................................ 702/85
(58) Field of Classification Search .................... 702/85
See application file for complete search history.

(56) References Cited

U.S. PATENT DOCUMENTS

| | | | |
|---|---|---|---|
| 6,823,277 B1 | 11/2004 | Poulsen | |
| 6,952,808 B1* | 10/2005 | Jamieson et al. | 715/833 |
| 2001/0010460 A1* | 8/2001 | Miller et al. | 324/67 |
| 2003/0154056 A1* | 8/2003 | Ito et al. | 702/188 |
| 2004/0233061 A1* | 11/2004 | Johns | 340/575 |
| 2005/0027656 A1* | 2/2005 | Tobler et al. | 705/53 |
| 2005/0238538 A1* | 10/2005 | Braig et al. | 422/82.05 |

OTHER PUBLICATIONS http://en.wikipedia.org/wiki/Central_processing_unit, p. 1-13.*
http://209.161.33.50/dictionary/resolution, p. 1-2.*
http://209.161.33.50/dictionary/update, p. 1-2.*
Agilent 8511A/B and Antenna Measurement System Performance Verification Software, Installation and Getting Started Guide, Manual part No. 5962-0493, Agilent Technologies, p. 1-44, Dec. 1999.*
Agilent 8511A/B and Antenna Measurement System Performance Verification Software, Installation and Getting Started Guide, Manual part No. 5962-0493, Agilent Technologies, p. 1-44, Dec. 1999.*
http://www.merriam-webster.com/dictionary/instrument, p. 1.*

* cited by examiner

*Primary Examiner*—Tung S Lau
(74) *Attorney, Agent, or Firm*—June L. Bouscaren

(57) ABSTRACT

An electronic measurement apparatus and method provides for an instrument requiring at least one periodic calibration. The instrument has an instrument processor and an instrument memory. The instrument is configured to accept and store calibration data related to the periodic calibration. The instrument is further configured to maintain a calibration history of the calibration data in the instrument memory.

17 Claims, 15 Drawing Sheets

Boot up dialog:

Invalidation Information dialog:

Configure Alerts:

METHOD AND APPARATUS FOR MANAGEMENT OF CALIBRATION DATA

BACKGROUND OF THE INVENTION

Many kinds of test and measurement equipment and systems must be calibrated on a regular basis in order to assure measurement integrity. Many manufacturers stay ISO-9001 or ISO-9002 compliant and many defense and aerospace manufacturers have stringent in-house quality systems requiring traceability records to NIST standards. In order to stay compliant with any quality system, it is necessary to maintain and manage calibration of all electronic measurement equipment. In a production environment, calibration is often directly related to warranted product deliverables. Measurement data from equipment requiring calibration that is uncalibrated at the time of measurement is of little value and can be a significant liability if a product is measured on what was thought to be calibrated and then delivered before the uncalibrated status is discovered. Such an event results in a defective test. A defective test significantly increases production cost because it may require a notice to whom a product was delivered or recall and retest of the product. Accordingly, it is important to product manufacturers to maintain and manage a calibration process and schedule. As laboratories and manufacturing operations use more and more equipment that require calibration, the maintenance and management of the calibration becomes more complicated, and therefore costly, time consuming and prone to error.

One traditional method of maintaining and managing equipment calibration is through use of a calibration sticker as shown in FIG. 1 of the drawings with or without an automated tracking system. FIG. 1 of the drawings is a spectrum analyzer requiring periodic calibrations shown for purposes of illustration. The calibration sticker 103 indicates a date when a calibration was last performed and a date as to when a calibration is next due. The calibration sticker is typically placed in a visually prominent location on the face of the relevant equipment for a person to see in order to take steps to provide the next calibration. Entities that use an automated tracking system manually enter calibration information into a tracking program. The automated tracking system provides organization and calibration data management, but the manual data entry step adds time and cost to the calibration management process. Different types of equipment may have different calibration intervals. The same piece of equipment may have multiple calibration types all with different calibration schedules. In this case, there is a large amount of data that must be manually entered and maintained. Multiply these challenges by many pieces of equipment and the calibration management of a typical laboratory or manufacturing operation becomes significantly more complex, time consuming and costly.

Another challenge with respect to prior art calibration management using a calibration sticker is that the sticker does not typically include the type of calibration that was performed and does not record any history or traceability information relating to the calibration. When calibration traceability and history data are important, they are typically kept in a notebook or in the central tracking system. The update and maintenance procedure, therefore, requires manual update and organization of separate documents or a central database and retention of the data or documents separate from the equipment. The greater the amount of equipment needing calibration, the more complex, time consuming and error prone this process becomes. Additionally, there is a risk that the calibration data can get out of date or be lost altogether. In some cases, whether any single measurement equipment requires calibration is application dependent. Due to the limited amount of space on the front panel of measurement equipment, much of this information simply will not fit.

There is a need, therefore, for a method and apparatus for improved maintenance and management of equipment calibration, calibration requirements, and calibration data.

BRIEF DESCRIPTION OF THE DRAWINGS

An understanding of the present invention can be gained from the following detailed description of the invention, taken in conjunction with the accompanying drawings of which.

DETAILED DESCRIPTION

An automated calibration management process and apparatus uses a software calibration component that is independent of the type of measurement equipment and type of measurements made on a particular piece of measurement equipment. The calibration component is useful in processor based test and measurement equipment and systems (referred to herein as "an instrument" for purposes of clarity) that require periodic calibrations and is able to present a graphical user interface (herein "GUI") and programmatic control to assist in the process of managing calibration and calibration data. Under the present nomenclature, an "instrument" also refers to a plurality of instruments cooperatively operating as a unit that also require periodic calibrations. The calibration component is also able to communicate calibration status and other information to one or more external processors, thereby obviating the need for any GUI. As used herein, the term "processor" refers to any system that is capable of processing data, for example a computer, microprocessor, field programmable gate array ("FPGA"), application specific integrated circuit ("ASIC") or other specialized logic now known or later developed. For all instruments running on a similar operating system platform, the calibration component is reusable and is independent of the specific type of measurements taken by the instrument. For instruments running on different platforms, the calibration component is different, but performs similar operations. In a specific embodiment of the calibration component, the calibration component runs on a Microsoft Windows operating system. It is implemented in C# and runs in a Microsoft NET framework. Other operating systems and environments are also appropriate for implementation of the teachings herein. As one of ordinary skill in the art appreciates, however, there are certain implementation advantages to using a common platform across multiple instruments. The calibration component is implemented as a service and runs constantly in the background when the instrument is powered and operational. As such, other known and later developed programs and services that are compatible with the .NET environment can connect and interact with the calibration component for purposes of determining calibration status, receiving calibration alerts, and retrieving calibration history. As one of ordinary skill in the art appreciates, the specific implementation of the present teachings disclosed herein uses a software based component, but the teachings herein may be implemented in a hardware format using logic gate, and ASIC or as an FPGA or a combination of hardware and software without departing from the basic teachings.

Figure 1:
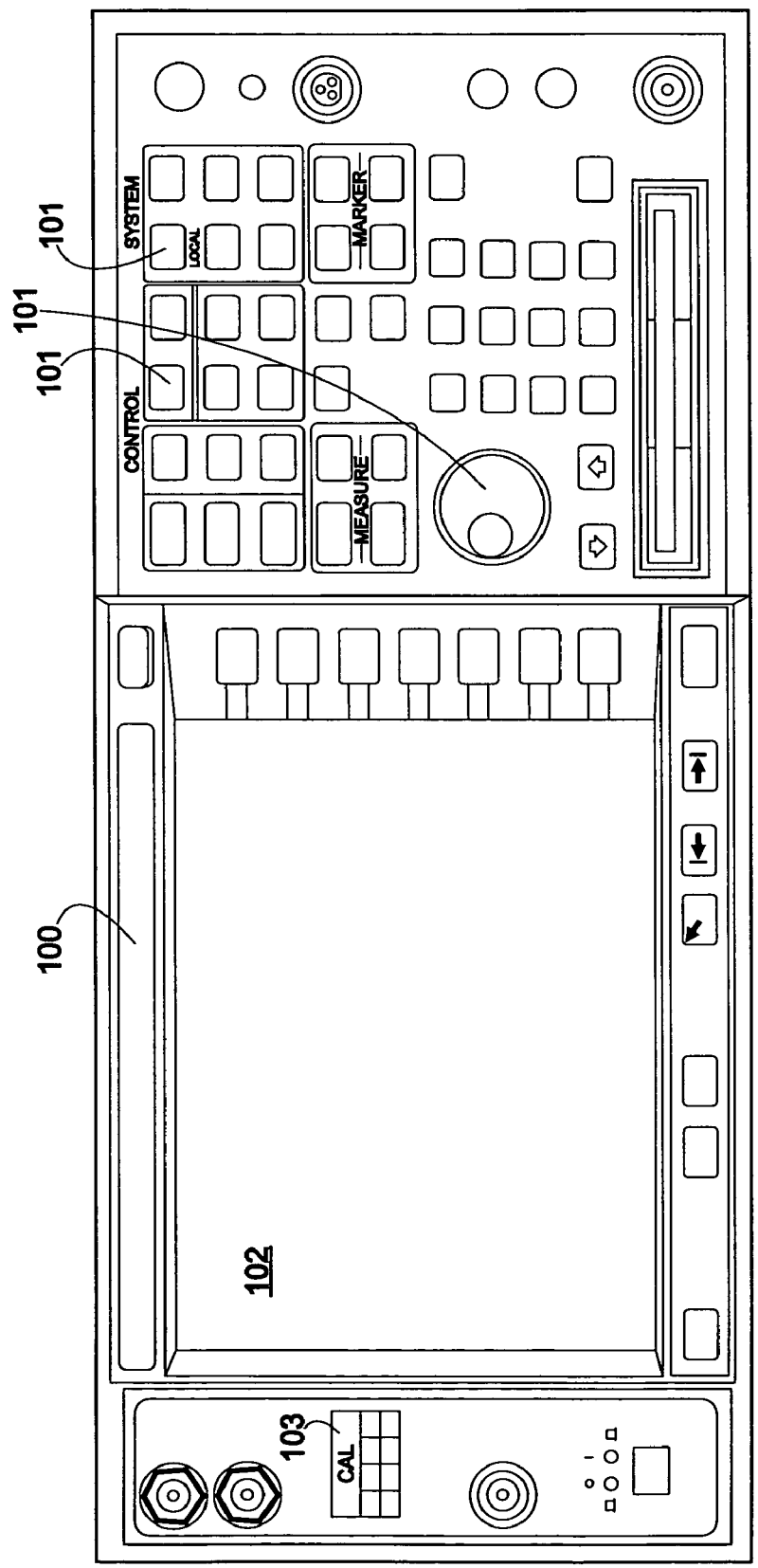
FIG. 1 shows a traditional calibration sticker shown affixed to an electronic measurement apparatus.

FIG. 1 of the drawings illustrates a conventional spectrum analyzer instrument 100 that requires periodic calibrations. FIG. 1 also illustrates a conventional calibration label 103 used for calibration management of the instrument 100. The instrument 100 has various buttons 101 and a display 102 for front panel interactive control of the instrument functions. As will become apparent, the teachings herein are well suited to an instrument having a CRT-type of display 102, but are also adaptable to an instrument with a far more rudimentary display including just a light indication using LEDs or one with no display and only a network communication to a computer. Instruments without a display are useful in remote monitoring situations and can benefit from the present teachings, which permit remote calibration management.

In a specific embodiment according to the present teachings, there are two use models that guide a process in which the calibration management component presents and interacts with a user. In a first use model, a manufacturer of the instrument to be calibrated performs one or more periodic calibrations on the instrument as recommended by the manufacturer. In a second use model, an entity other than the manufacturer, such as the instrument user or third party calibration service laboratory, performs one or more calibrations as needed. In many cases, an instrument will have multiple calibrations having different calibration types each following different use models. Results and a current status of periodic calibrations that are performed by a manufacturer are different from periodic calibrations defined and performed by a third party or owner of the instrument. Permission levels for changing certain calibration parameters, therefore, are also different to reflect the realities of the two use models. Accordingly, the calibration component distinguishes between the two use models when reporting a current calibration status and offers different protection levels to ensure the integrity of the calibration information. A manufacturer may license its calibration procedure to a third party (herein "a licensed third party"), allowing them to perform calibrations consistent with the first use model as if the manufacturer actually performed the calibration.

Figure 2:
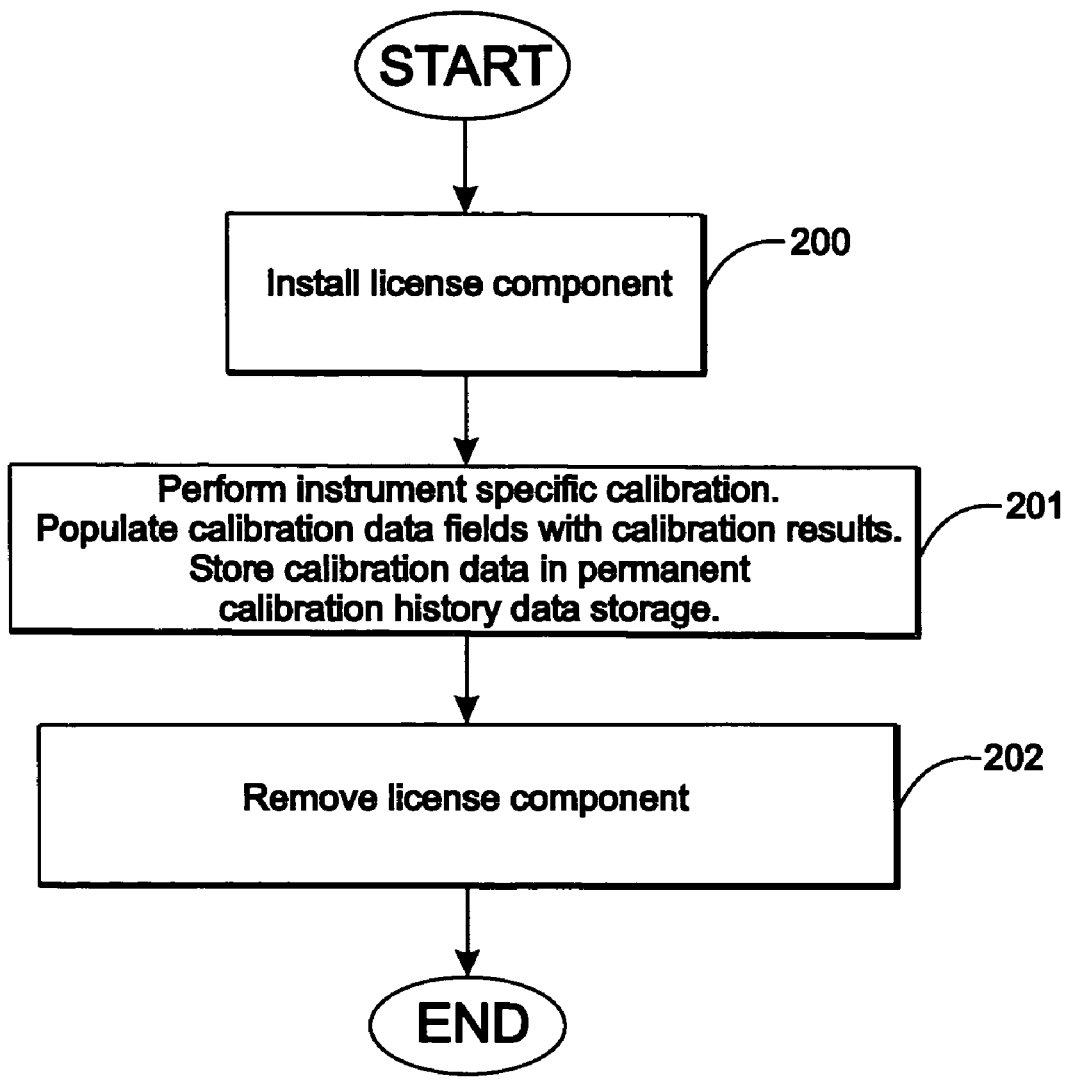
FIG. 2 is a flow chart of a first use model in a calibration management process.

With specific reference to FIG. 2 of the drawings, there is shown a flow chart of a high-level calibration process flow for the first use model. When a manufacturer receives an instrument for calibration, a license component is installed 200 which acts as a software key providing access to all calibration data fields including certain protected calibration data fields used by the calibration component.

In a specific embodiment, there are three levels of calibration data access; supervisory, administrative, and user. The supervisory security level is accessible only using the license software component and is consistent with the first use model. The administrative security level is password protected and is consistent with the second use model. The user security level is for instrument use. All data fields are viewable by all security levels. The security level defines whether data fields may be modified. The supervisory security level is able to modify all calibration data fields including all protected calibration data fields. The administrative security level is not able to modify a supervisory subset of protected calibration data fields, but is able to modify all other protected calibration data fields. The user security level is not able to modify any of the calibration data fields. More security levels may be defined in alternative embodiments, but the three distinct levels are considered adequate for purposes of the present teachings. Definition of which calibration data fields fall into the supervisory and administrative security levels is defined by the instrument manufacturer, a specific embodiment of which is disclosed herein.

The manufacturer or licensed third party then performs an instrument specific calibration 201. In a specific embodiment, this process involves connecting the instrument to an external computer running a specific calibration service program and accessing and communicating with the instrument using the .NET remoting capability or alternate I/O Protocol. The instrument specific calibration procedure provides relevant information regarding the calibration performed for entry into certain data fields including, but not limited to, a date of the calibration, the calibration type, a calibration interval, a default calibration interval, and a calibration trace number. Additionally, the calibration procedure resets a last calibration date so that any calibration alerts to indicate when a next calibration is due and when one or more calibration alerts are to be issued is also updated. Specifically, the calibration component sets up alerts when a calibration type is created. If the last calibration date or the interval changes, the calibration component updates the alerts based upon the updated last calibration date or interval. Automatic updates avoid the risk of failure to establish new alerts after a calibration is performed. At first power up after a calibration, the boot dialog indicates that alerts have been modified and permits a change to those alerts as desired. The calibration data is further stored in a permanent and access-controlled storage area within the instrument for purposes of maintaining a protected calibration history 1500 within nonvolatile memory in the instrument. After entry of the updated calibration information via the calibration procedure 201, the calibration component is able to access and modify all of the data stored during the calibration process. The calibration component updates data fields used by a calibration component user interface for reporting the calibration status on the display 102 of the instrument 100. The calibration process then removes 202 the license component, which prohibits further write access to the supervisory subset of the protected calibration data fields. A process flow for the second use model is similar. A difference between the first and second use models is an absence of the installation 200 and removal 202 steps for the license component and the modification of the supervisory subset of protected calibration data fields.

Calibrations may be performed programmatically in both use models and may also be performed manually with instrument front panel interaction, but only with supervisory (herein "supervisor") or administrative (herein "administrator") access. In a specific embodiment, multiple types of calibrations can be used to efficiently control and manage calibration costs. In a specific example, the instrument administrator may wish to calibrate a very narrow frequency range more often than the calibration interval recommended for the full manufacturer's calibration, which calibrates the instrument over an entire frequency range. In this case, alerts for a custom calibration performed by the administrator can be established every 3 months, while the full manufacturer's calibration alerts are established to occur annually. This permits an administrator to maximize calibration integrity for a frequency range of interest while minimizing instrument downtime and cost of full calibrations. In a specific embodiment, the administrative security level is used to establish custom calibration types and calibration schedules for an instrument. To maintain quality control over the calibrations, the calibration data fields for establishing custom calibration types and schedules are modifiable only through the administrative security level. To implement the security levels, at first power up of the instrument, there is a password protected administrative log-in. User access may be password protected or not as desired by the administrator. To change security levels, as is conventional with operating systems having multiple security levels, one with access to the administrative security level logs off upon completion of administrative tasks to permit a log in at a user security access level.

One of five possible color-coded calibration icons is displayed on an instrument at all times and indicates a current calibration status. A calibration icon can be anything that invokes an intuitive association with the calibration process, but in a specific embodiment, is a small image depicting a set of calipers. A black icon indicates that the instrument is not subject to periodic calibration. The integrity of the calibration status is different in the second use model because an administrator may define custom calibrations that are not in accordance with manufacturer's recommendations. On the other hand, the administrator-defined calibrations may be more stringent that those recommended by the manufacturer. Accordingly, the displayed calibration icon is different to indicate the potential differences and ramifications between the first and second use models. A green icon paired with a manufacturer's logo reflects the first use model and indicates that the instrument is subject to periodic calibration and that the calibration is valid and was performed by the manufacturer or by a manufacturer's authorized calibration software application or a manufacturer licensed third party. A green icon without a manufacturer's logo reflects the second use model and indicates that the instrument is subject to periodic calibration and the calibration is current, but that the calibration was performed by an entity other than the manufacturer of the instrument or by a manufacturer's authorized calibration software application or a manufacturer licensed third party. A yellow icon indicates that the instrument is subject to periodic calibration and the calibration is current, but that the calibration is to expire within some predefined period of time. A red icon indicates that the instrument is subject to periodic calibration and that the calibration is expired or an adverse calibration state is detected. The color-coded calibration icon, therefore, performs the same function as the calibration sticker, but provides enhanced calibration status information. Accordingly, an embodiment of the present teachings may obviate a need for a calibration sticker and provides additional information to a user. In an alternate embodiment, the calibration icon would use different shapes enclosing the calipers, with or without the change in calibration icon colors, to further graphically represent the calibration status of the instrument. As an example that is consistent with certain universal and language independent symbols, a calibration current status may have an icon, such as the calipers with or without the manufacturer's logo enclosed by a circle, a calibration pending status may have the icon enclosed by a square rotated 45 degrees, and a calibration expired may have the icon enclosed by a circle with a line through it. As another alternative, the icon may be different entirely for each calibration status. The use of color independent indications may be important to accommodate those who cannot distinguish certain colors. In some cases, an audible signal for each change in calibration status may be appropriate. There are other options, too many for specific enumeration herein, for indicating calibration status that will occur to one of ordinary skill in the art.

Figure 3:
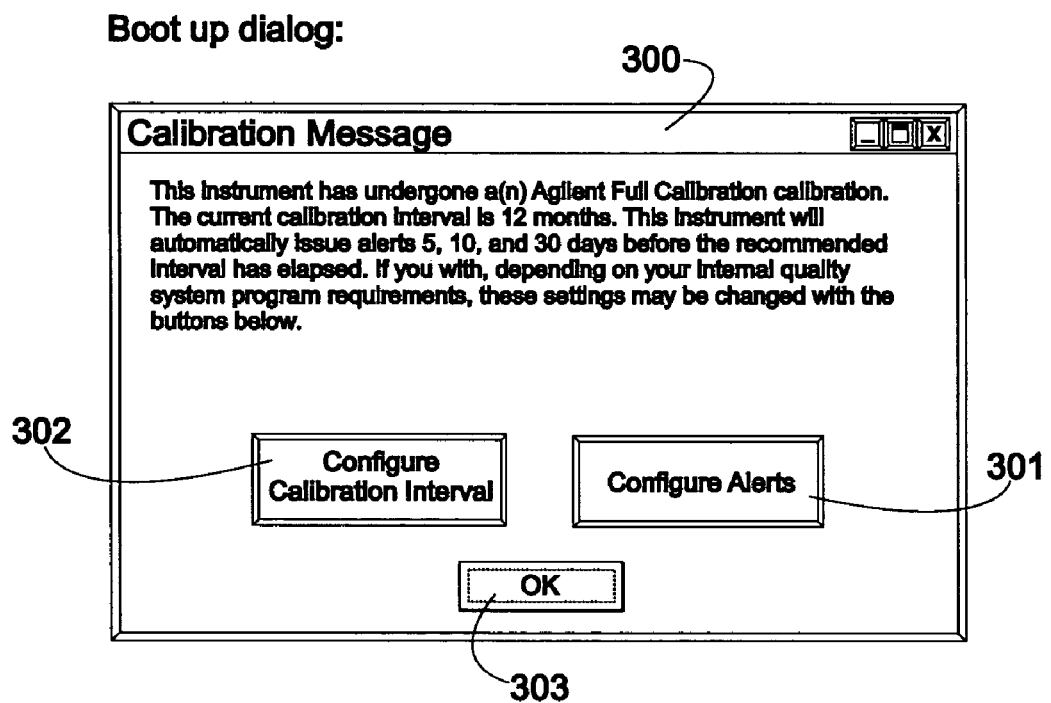
FIGS. 3 through 15 show screen shots of an embodiment for calibration management according to the present teachings.

With specific reference to FIG. 3 of the drawings, there is shown a screen shot of a GUI according to the present teachings showing a boot up dialog box 300. The boot up dialog box 300 is displayed upon first power up after a calibration is performed. The boot up dialog box 300 indicates what type of calibration was most recently performed, a calibration interval for the calibration type performed, and a calibration alert schedule. It also indicates that certain calibration settings may be changed and offers a configure alerts button 301 and a configure calibration interval button 302. Optionally, the boot up dialog box 300 may also display additional instrument specific calibration information. Using standard dialog box protocol, an "OK" button 303 in all dialog boxes discussed herein acknowledges and exits the pending dialog box.

Figure 4:
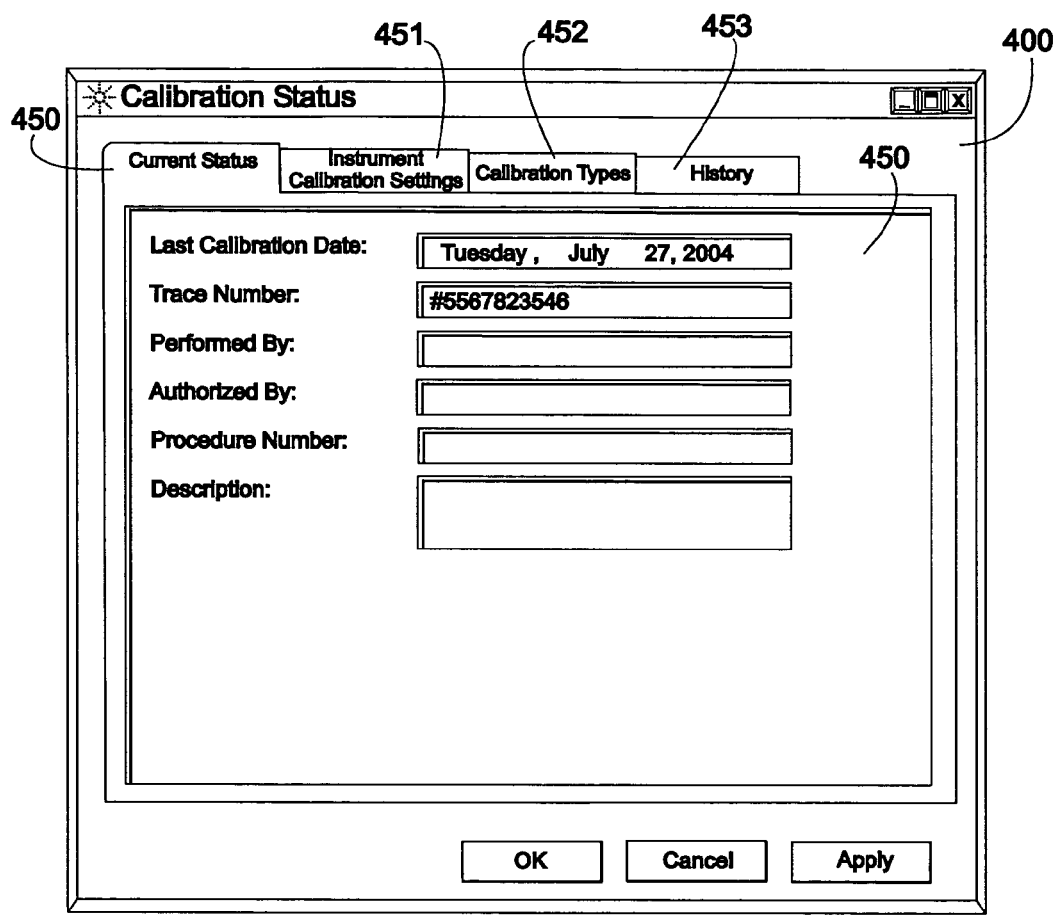
Figure 5:
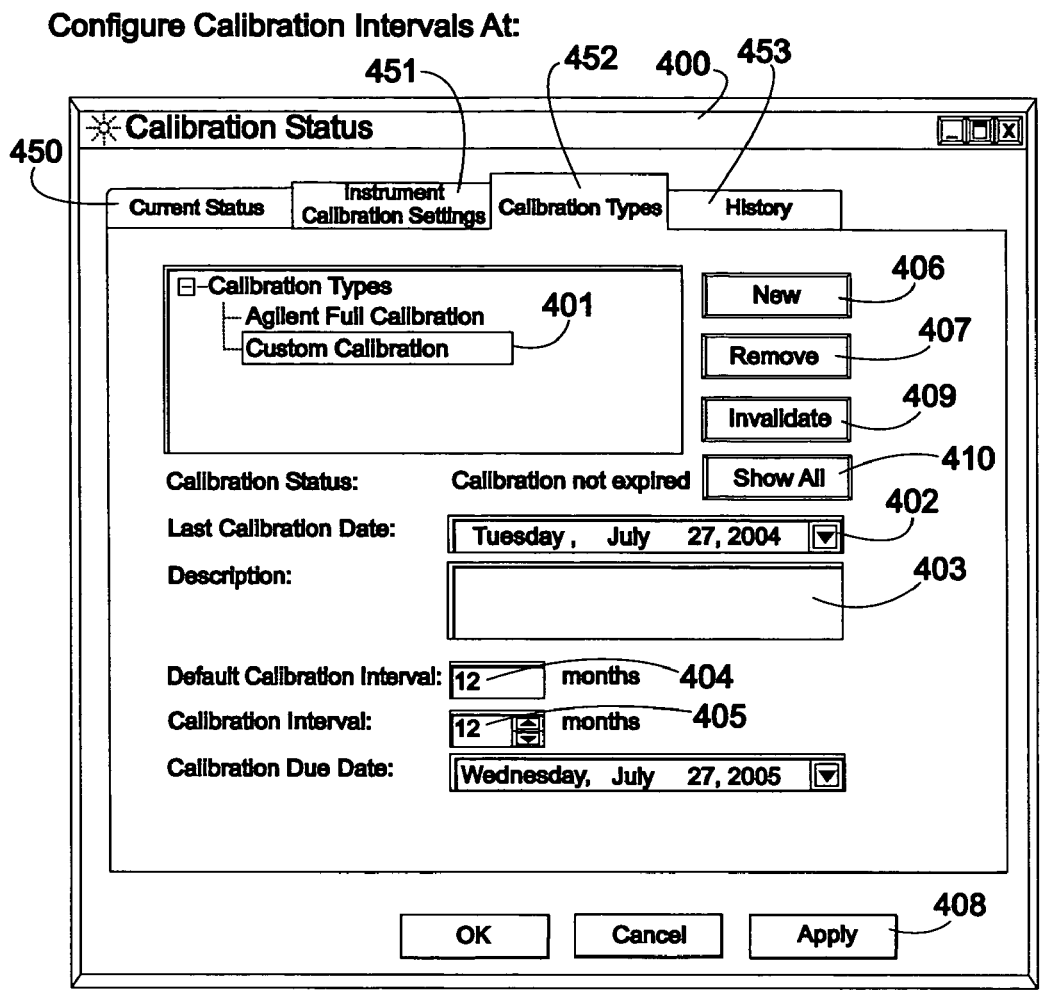

Clicking the configure calibration interval button 302 displays a calibration status dialog box 400. The calibration status dialog box 400 is also accessible through a main menu display on the instrument 100. With specific reference to FIG. 4 of the drawings, there is shown an embodiment of the calibration status dialog box 400. The calibration status dialog box 400 includes four calibration menu tabs; current status menu tab 450, instrument calibration settings menu tab 451, calibration types menu tab 452, and calibration history menu tab 453. The current status tab 450 displays information regarding the most recently performed calibration. A user may not modify any of the data fields, but an administrator is able to modify all fields for a custom calibration. Only a supervisory access security level is able to modify this information for a manufacturer's calibration. With specific reference to FIG. 5 of the drawings, there is shown the calibration type menu tab 452. The calibration type menu tab 452 initially displays only information related to the most recently performed calibration. Clicking a "show all" button 410 displays a list of all calibration types 401 that remain within their calibration intervals or are expired within some predefined amount of time. The list of calibration types 401 may include one or more calibrations performed by a manufacturer of the instrument and one or more custom calibrations performed by a third party with administrator access. Highlighting any one of the calibration types then dictates what information is displayed in a remainder of the calibration status dialog box 400 including the current status calibration tab 450. Without administrative access, all data fields are provided in a "greyed out" format, which provides pertinent information, but indicates that the data field is not modifiable. According to convention, any field that is modified activates the apply button 408 and clicking the apply button 408 stores the changes. The calibration status dialog box 400 also permits an administrator to configure a new calibration type 406 in accordance with the second use model and remove 407 an existing custom calibration type.

Figure 6:
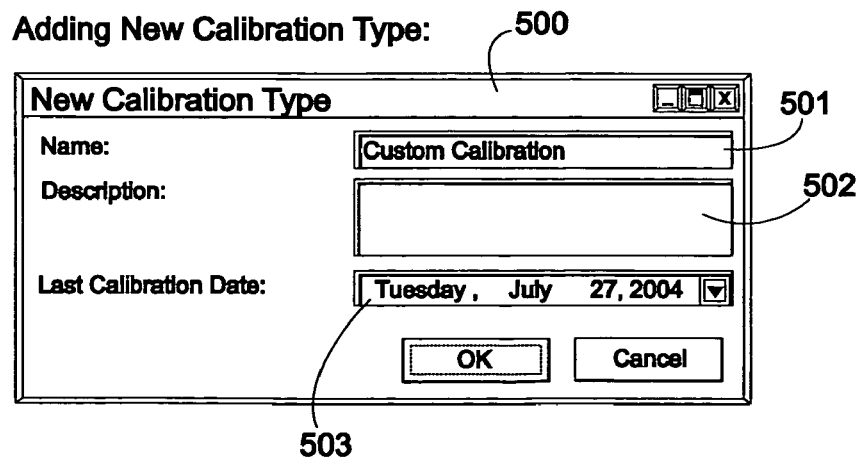

The new calibration button 406 brings up a new calibration type dialog box 500 where an administrator is able to define a custom calibration. With specific reference to FIG. 6 of the drawings, the new calibration type dialog box 500 displays a calibration type name 501 for the calibration type highlighted in the previous dialog box 400. There is an entry field for a calibration date 503, and a description 502 of the calibration type.

Figure 8:
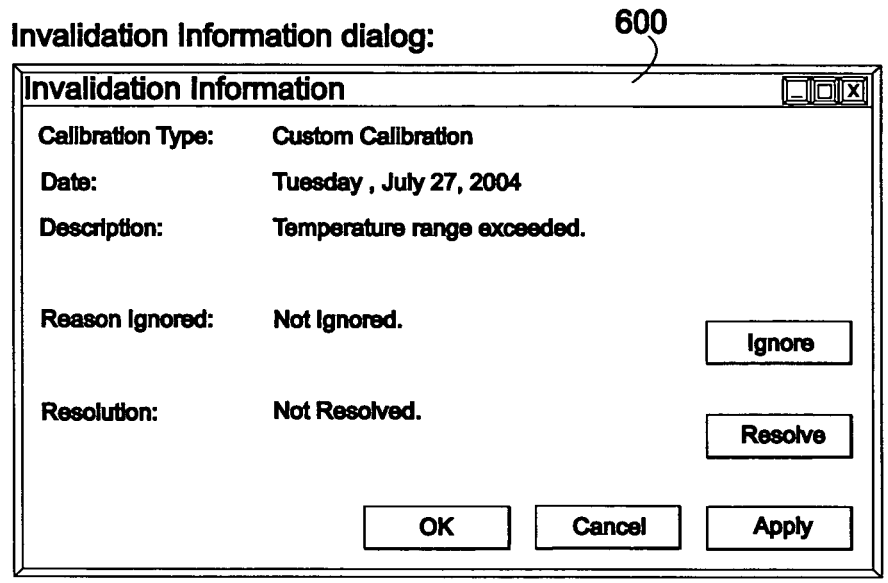

If something has happened to compromise an existing calibration, the calibration icon reflects such an event, by changing color, shape or both for instance. Additionally, a calibration can be marked as invalid by the administrator by clicking an invalidate button 409 in the calibration state dialog box 400 in the calibration type calibration menu tab 452 when a calibration type is highlighted, at which point an entry for the invalidation event (not shown) appears on the calibration status dialog box 400. Historical invalidation information as illustrated in FIG. 8 of the drawings is available by double clicking a calibration type 401 entry. The invalidation event and any resolution of the event or if the invalidation event is ignored is stored in the calibration history 1500. An example of a calibration invalidation event is an over temperature condition in the instrument. An administrator can resolve an invalidation condition or choose to ignore it, but the action chosen is stored.

Figure 7:
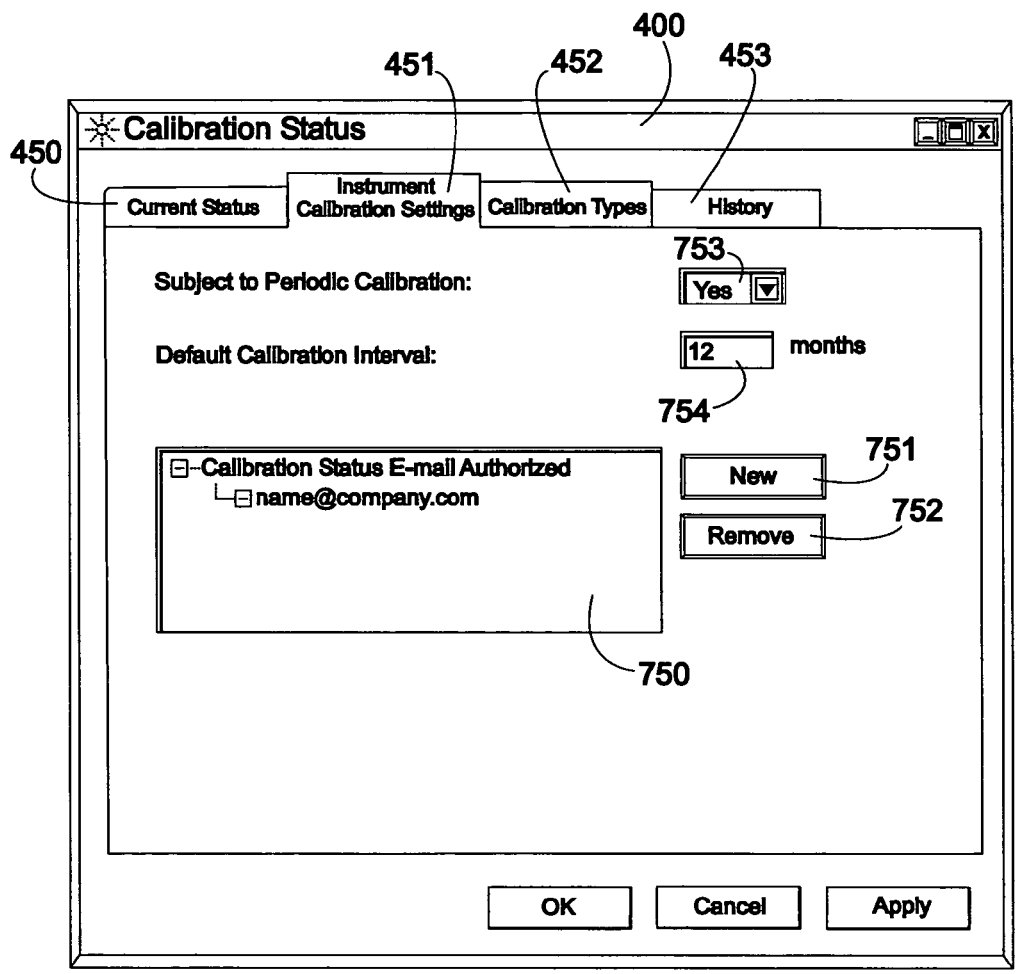

With specific reference to FIG. 7 of the drawings, there is shown the instrument calibration settings menu tab 451 of the calibration status dialog box 400 in which an administrator can establish one or more e-mail addresses 750 to which the instrument will send an e-mail upon a change in calibration status. E-mail addresses may be added by clicking a new button 751 or removed by clicking a remove button 752. Also in the instrument calibration settings menu tab 451 is a setting for whether the instrument is subject to periodic calibration 753 and the default calibration interval 754. Whether the instrument is subject to periodic calibration is modifiable only with the administrator security access and the default calibration interval is modifiable only with the supervisor security access.

Figure 9:
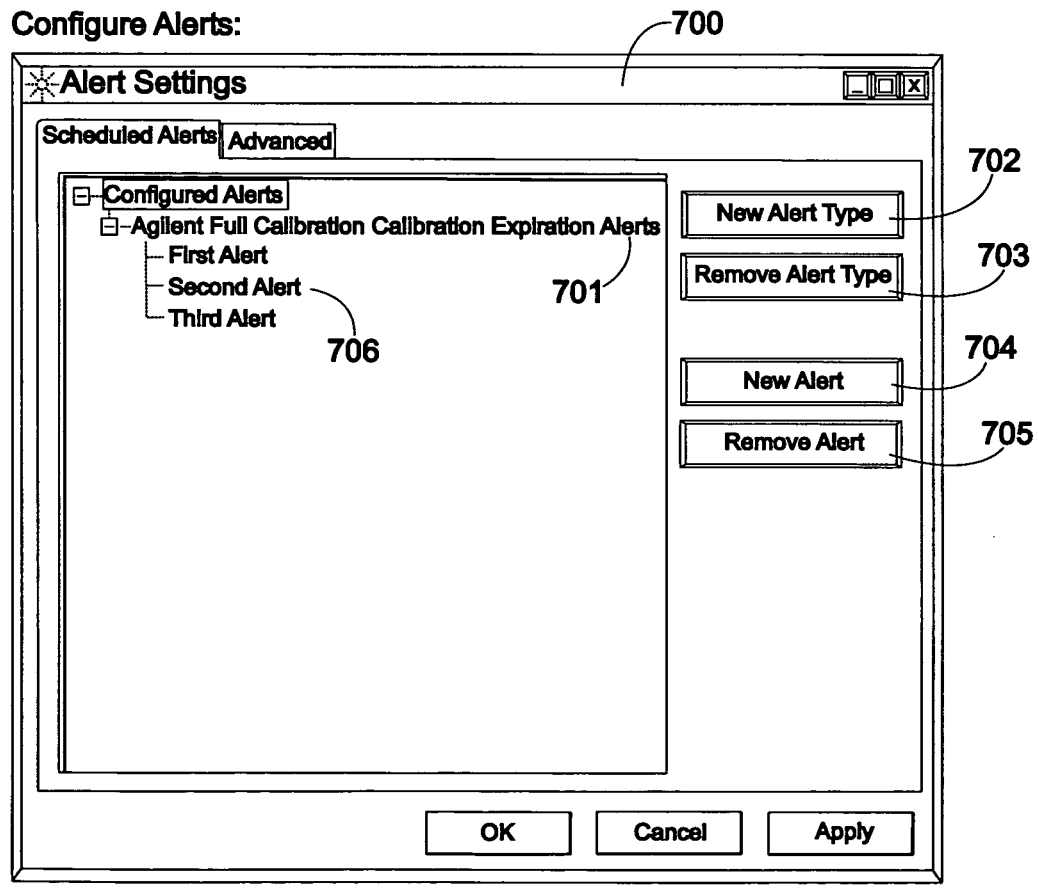
Figure 10:
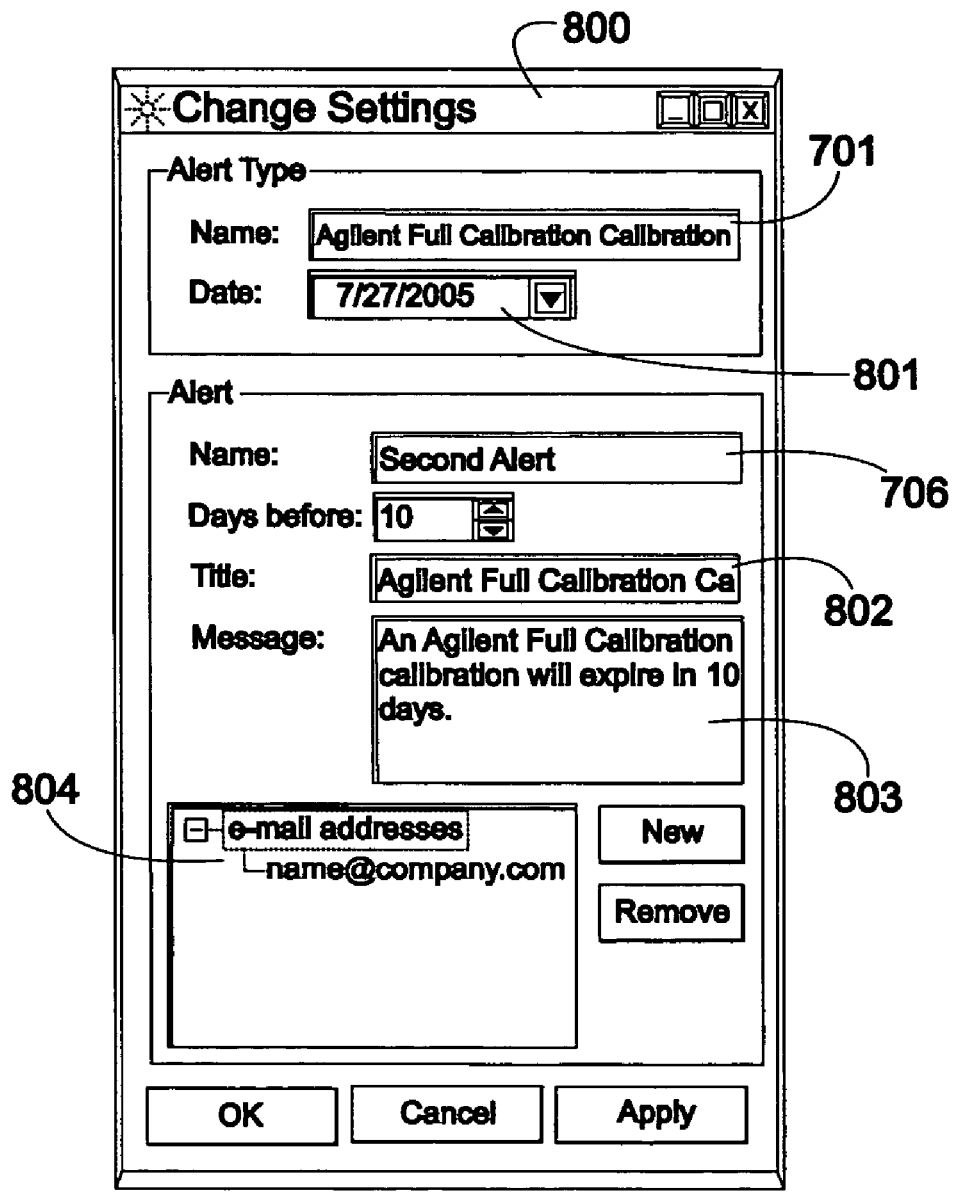
Figure 11:
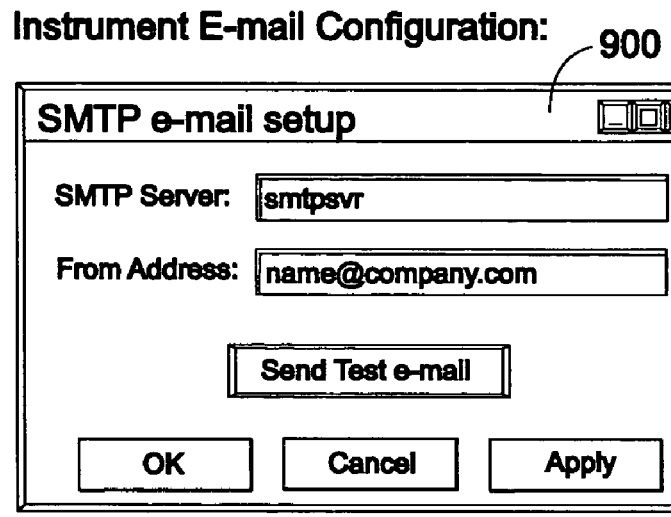
Figure 12:
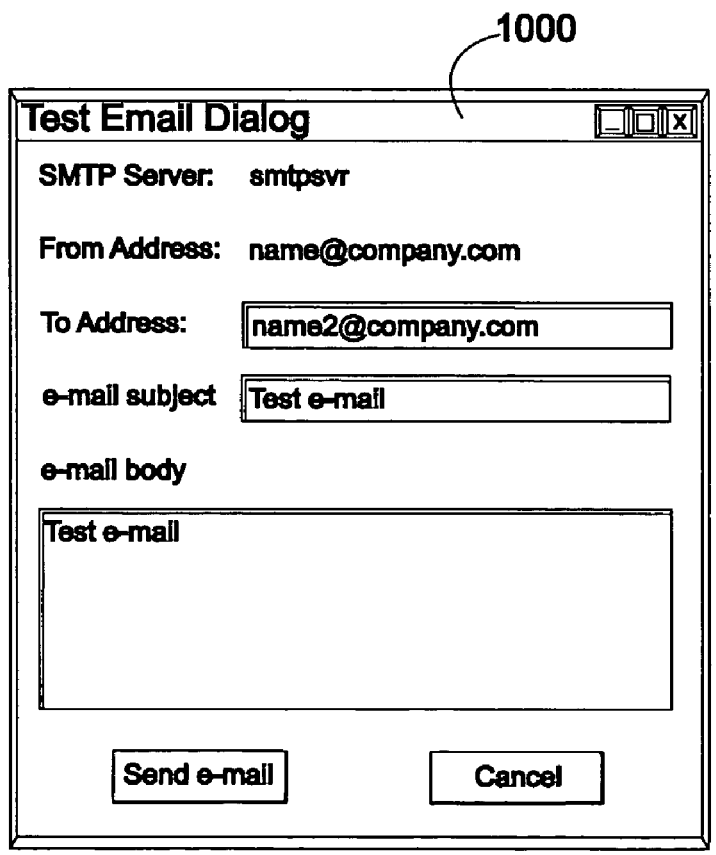
Figure 13:
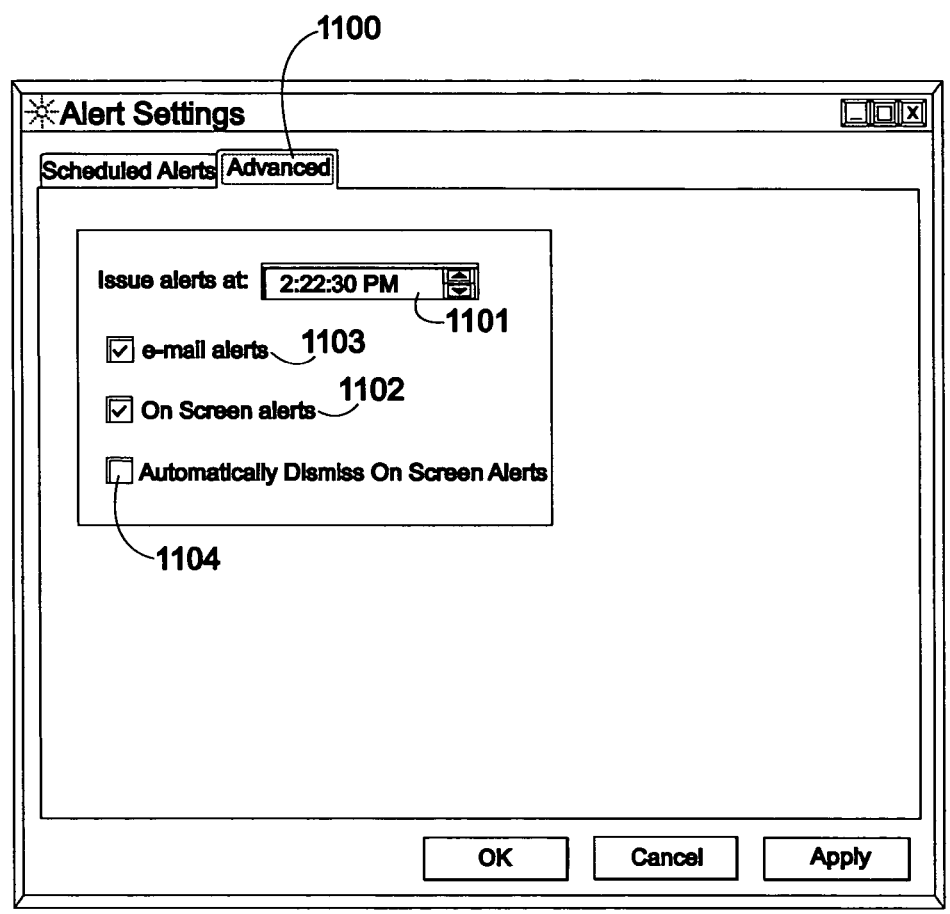

With specific reference to FIG. 9 of the drawings, clicking the configure alerts button 301 from the boot-up dialog box 300 or accessing the configure alerts facility from the instrument main menu displays an alert settings dialog box 700 that permits an administrator to configure 702 or remove 703 a new alert type 701 and configure 704 or remove 705 a new alert 706. The new alert type button 702 permits configuration of a new alert type 701 using a portion of a change settings dialog box 800 as shown in FIG. 10 of the drawings. The new alert type 701 has associated with it a unique alert name 706 and a calibration expiration date 801. Any number of alerts 706 may be established for each alert type 701 to remind a user that expiration of one of the calibrations is imminent a certain amount of time before the actual expiration of the alert type expiration date 801. Each alert 706 may be established to display a title 802 and an alert display message 803 a specified amount of time before the calibration expiration date. In addition, if the instrument is routinely connected to a communication network, an alert 706 can establish one or more e-mail addresses 804 to which an e-mail message is sent at the time of the alert 706. These alert e-mail addresses are distinguished from the set of e-mail addresses to which a message is sent upon a change in calibration status, but in a typical use of the present teachings, the e-mail addresses may be the same. With specific reference to FIGS. 11 and 12 of the drawings, an e-mail dialog box 900 is available to an administrator when setting up an alert e-mail address 804 for conventional establishment of e-mail parameters. A test e-mail alert dialog box 1000 is also available for testing of the alert e-mail parameters. There are similar dialog boxes for the calibration status e-mail addresses as well. An advanced alert settings menu 1100 as illustrated in FIG. 13 of the drawings provides additional settings for all alerts including a time of day 1101 an alert is issued and whether an alert is to be issued in the form of a pop-up 1102 on the display 102 of the instrument 100, a communications network message 1103 or both. In addition, on-screen alerts may be automatically dismissed 1104.

Figure 14:
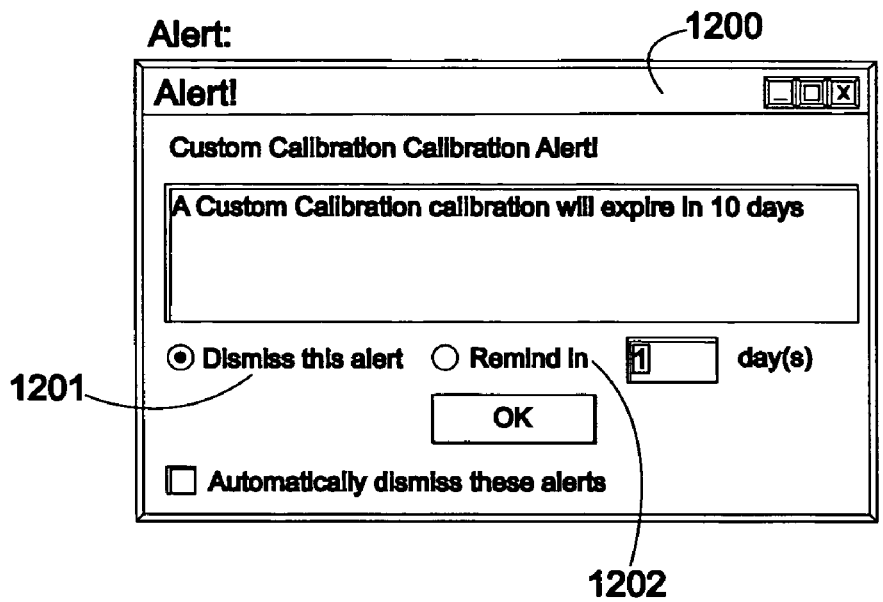

With specific reference to FIG. 14 of the drawings, there is shown an illustration of an alert 1200 issued on the display screen 102 of the instrument 100 when one of the established alerts 706 is tripped. The alert dialog box 1200 provides an option for a user to dismiss 1201 or to snooze the alert and issue another reminder 1202 of the alert in some number of days.

Figure 15:
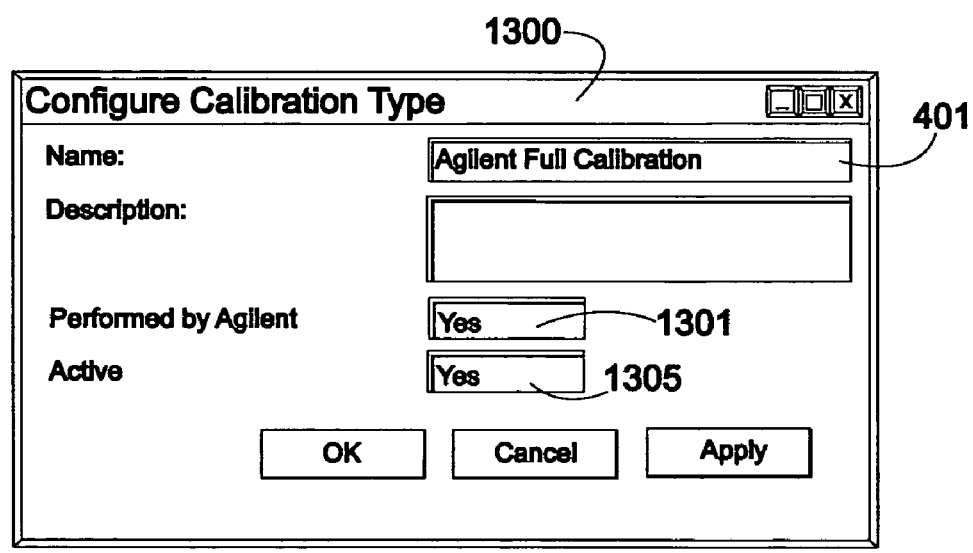

Because the present teachings permit more than one calibration to be managed per instrument, it presents a need to select which calibration is to be reflected in the icon status. With specific referent to FIG. 15 of the drawings, there is shown a configure calibration type dialog box 1300. Accessible by double clicking on one of the calibration types 401 from the calibration state dialog box 400, the configure calibration type dialog box 1300 has modifiable fields depending upon whether the calibration type is a manufacturer's calibration or custom calibration and depending upon the security level. The "Performed by manufacturer" box 1301 is displayed, but is not modifiable without supervisory access. If the calibration type is a manufacturer's calibration, a name of the calibration type 401 is also not modifiable without supervisory access. A "yes" indication in the active option field 1305 means that the present calibration type determines a status of the calibration icon. If the active icon field indicates "yes", it is not modifiable, but if the active icon field indicates "no", it is modifiable by an administrator to a "yes". When the administrator modifies the active icon field 1305, the calibration type that is currently active is reset to inactive. Accordingly, one and only one calibration type 1302 controls the icon status at any point in time.

Figure 16:
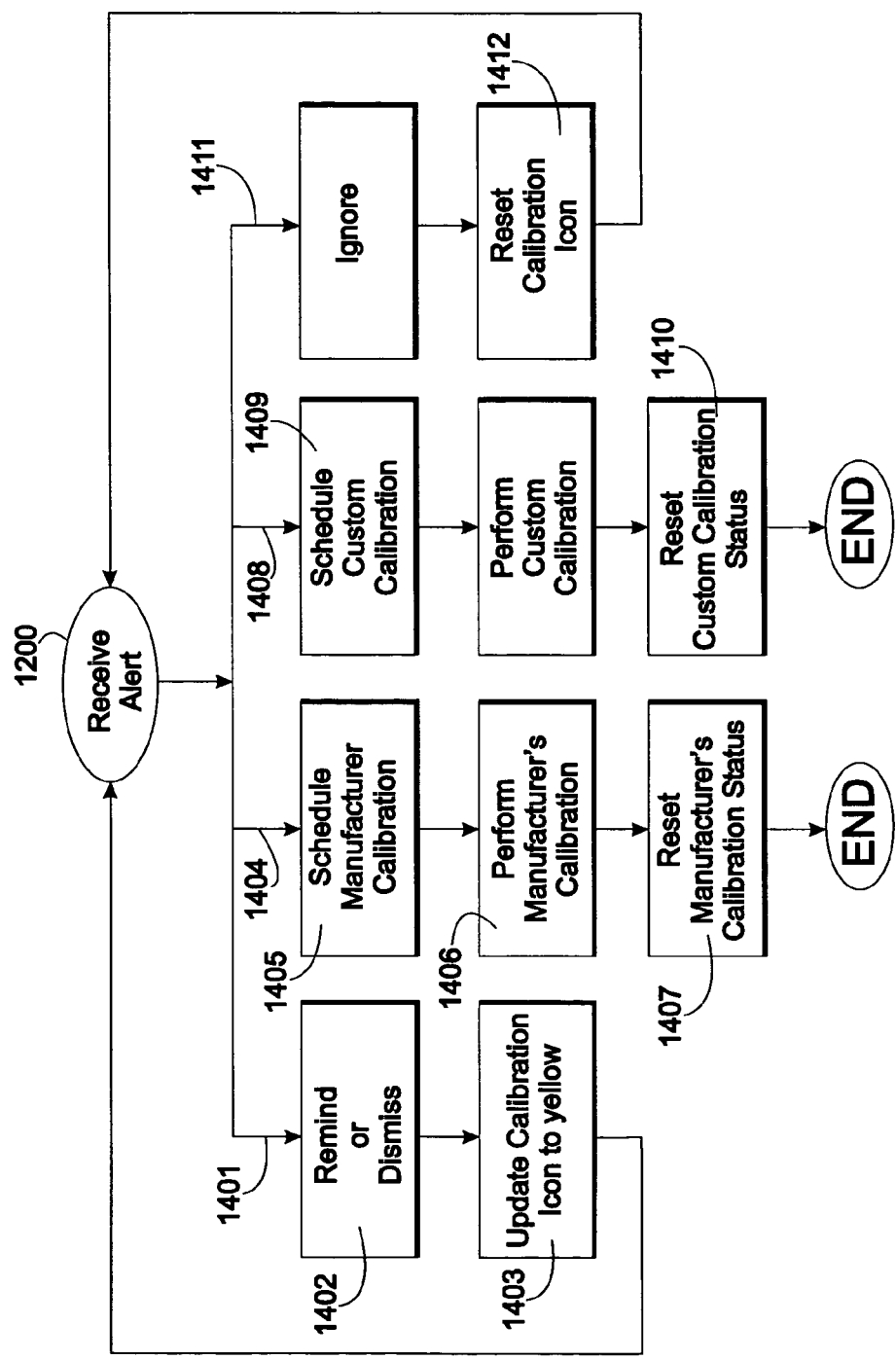
FIG. 16 is a flow chart of possible user options in response to an alert issued according to the present teachings.

With specific reference to FIG. 16 of the drawings, there is shown a flow chart of possible alternatives a user has after receipt of a calibration alert 1200. A first option 1401 is to "snooze" 1401 the alert 1200, which is to say request the system to issue another alert 1200 after some amount of time is elapsed. Once the alert 1200 is acknowledged either with a dismissal or reminder 1402, if the calibration that caused the alert is the active calibration, the calibration component updates the icon 1403 to a yellow or warning condition to indicate that a currently active calibration is within its specified expiration window. If programmed and if the instrument is in network communication, the instrument may also send a message alert. If it is a manufacturer's calibration that has generated the alert, a second option 1404 is to schedule 1405 and perform 1406 the manufacturer's calibration. If the instrument is connected to a communications network, it may be possible to perform this scheduling task automatically using the e-mail function or another network messaging service. A manufacturer's calibration resets 1407 the calibration status including the currently active calibration. After the calibration is performed, the calibration component detects a change in the calibration status and updates the calibration icon status to a green manufacturer's calibration icon and also resets the alert expirations. A third option 1408 is to schedule a custom calibration 1409. Depending upon what entity is performing the custom calibration, automatic scheduling remains an option. If a custom calibration does not have access to a license component, any calibration reset step 1410 performed serves to update information that causes an update to the calibration icon, but the calibration icon does not include the manufacturer's calibration marking, for example a manufacturer's logo included as part of the color-coded icon. A fourth option 1411 is to ignore all alerts 1200. In this case, the calibration icon is set 1412 to yellow until a calibration expires after which the calibration icon is set to red to indicate an expired calibration condition.

Figure 17:
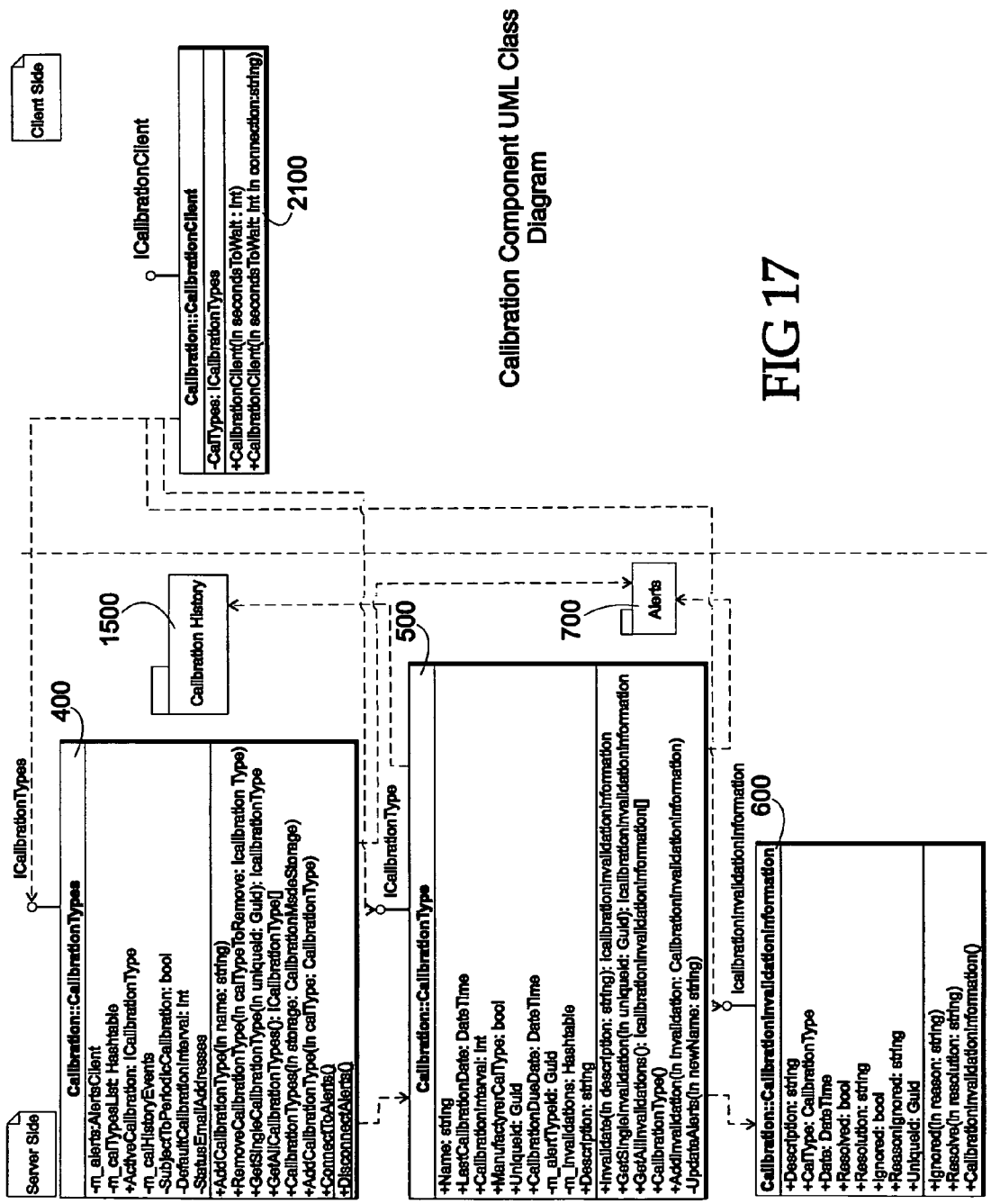
FIGS. 17 and 18 is a UML document of a specific embodiment of a calibration component according to the present teachings.
Figure 18:
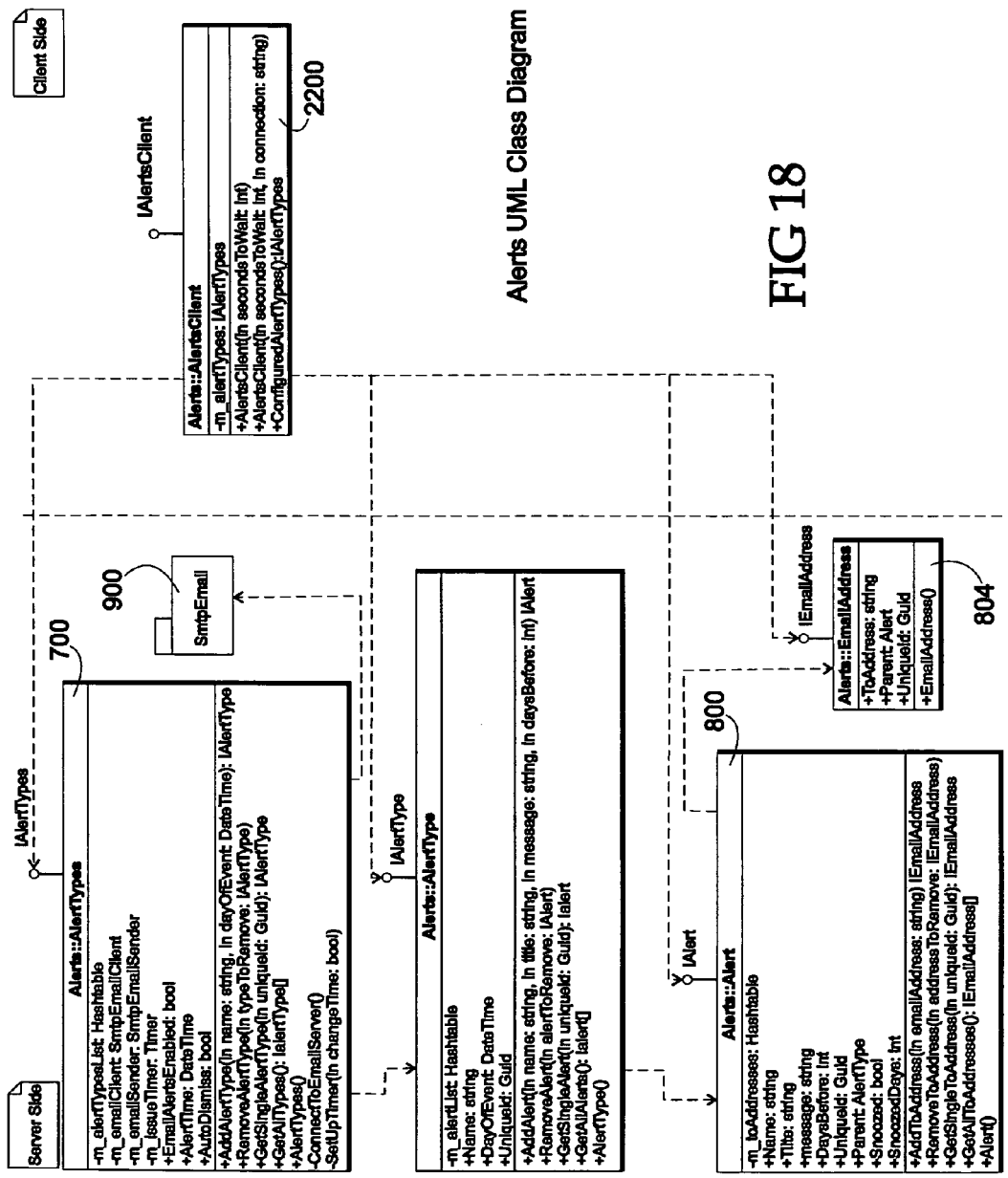

With specific reference to FIGS. 17 and 18 of the drawings, there is shown a UML document representing an embodiment of a calibration component according to the present teachings in which FIGS. 3 through 15 are screen shots of a portion of that which is represented in FIGS. 17 through 18. The UML document represents a specific implementation of the relationship of software component objects in an embodiment according to the present teachings. Other specific implementations will be apparent to one of ordinary skill without departing from the spirit and scope of the present teachings. With specific reference to FIGS. 17 and 18 of the drawings, there is shown the calibration history 1500 capability wherein time-stamped information relating to all calibration events is recorded. Also stored in the calibration history are copies of all calibration certificate documents. In a specific embodiment, the calibration certificate is shipped with the instrument 100 after a manufacturer or custom calibration is performed, and a copy of the certificate is stored in a .pdf format in the calibration history. Advantageously, the calibration certificate that includes information regarding traceability of the calibration cannot be separated from the instrument 100 and can be reprinted as necessary or downloaded from the instrument to a computer. In another embodiment, actual calibration data may also be stored in the calibration history 1500.

Figure 19:
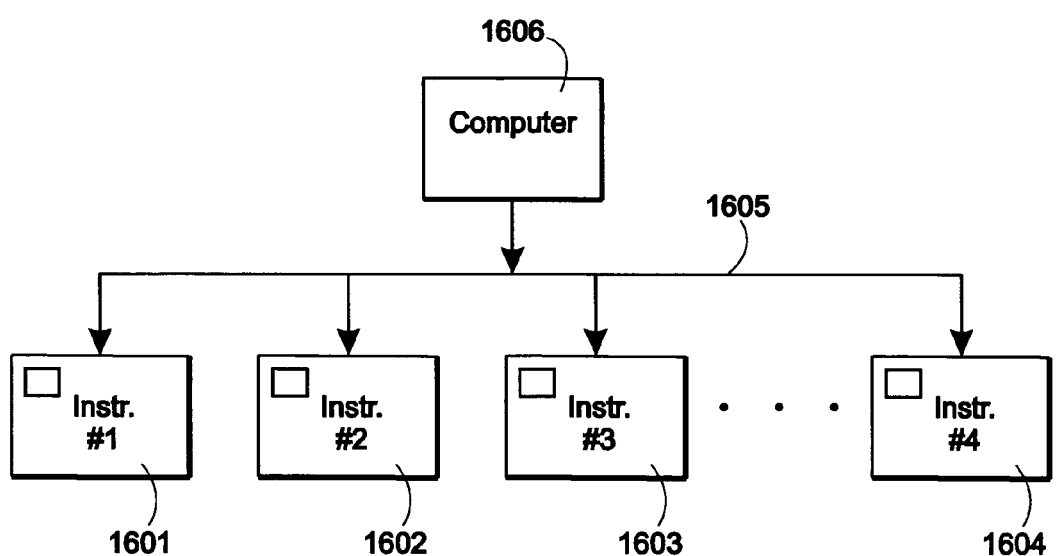
FIG. 19 is a diagram of an embodiment according to the present teachings providing centralized management of calibration schedules and calibration data.

With specific reference to FIG. 19 of the drawings, there is shown a diagram of a plurality of instruments 1601, 1602, 1603 and 1604 subject to periodic calibrations all connected to a communications network 1605. The communications network 1605 may be a LAN, GPIB, USB or any other network communications bus including a proprietary network bus. Also on the network 1605 is a computer 1606 that accepts and processes calibration alerts 1200 and calibration status change indications that are received from instruments so programmed. With reference to FIGS. 17 and 18, the computer (or client side) components to receive information as to calibration types 2100 and to receive calibration alerts 2200 are shown. In a specific embodiment, the client components 2100, 2200 are software modules that receive and process alerts issued by one or more of the instruments 100 on the communications network. In another embodiment, each instrument 1601-1604 is not programmed to send a message regarding a calibration alert. Instead, the client side software component operating in the computer 1606 can communicate with the calibration component in each instrument 1601-1604 to poll a current calibration status or to request and receive any information available to the calibration component including the calibration history 1500. In another specific embodiment, the computer 1606 can also be running a program that takes a next step to automatically schedule a calibration for the instruments that requires it. Advantageously, the computer 1606 is able to efficiently accept the distributed data and manage a calibration schedule of each instrument to plan and minimize the downtime that is a reality of periodic calibrations. In a specific embodiment, the computer 1606 is able to coordinate the calibration schedule with production schedules to achieve efficiencies not otherwise realizable. Additionally, this embodiment is useful for instruments 100 that do not have a local display 102. The calibration icon can be replaced with a plurality of lights or a single light that changes colors depending up the calibration status or no indication is necessary at the front panel and all calibration management can be done remotely. This is particularly useful for remote monitoring equipment that is accessed only when service or calibration is required.

Embodiment of the teachings are described herein by way of example with reference to the accompanying drawings describing a method and apparatus for distributed management of instrument calibration status. Other variations, adaptations, and embodiments of the present teachings will occur to those of ordinary skill in the art given benefit of the present teachings.

The invention claimed is:

1. An electronic measurement apparatus comprising:
   an instrument requiring at least one periodic calibration, the instrument having a local instrument processor and local instrument memory, and
   instructions configured to be executable on said local instrument processor for accepting and storing calibration verification data related to the at least one periodic calibration in the local instrument memory.

2. An electronic measurement apparatus as recited in claim 1 and further comprising instructions configured to be executable on said local instrument processor for interactive definition of said at least one periodic calibration.

3. An electronic measurement apparatus as recited in claim 1 and further comprising instructions configured to be executable on said local instrument processor for identifying and storing a calibration invalidation condition and a resolution thereof in the local instrument memory.

4. An apparatus as recited in claim 1 and further comprising accepting and storing calibration data related to at least two different periodic calibration types.

5. An electronic measurement apparatus as recited in claim 2 wherein said interactive definition permits establishment of at least two different calibration types.

6. An electronic measurement apparatus as recited in claim 2 wherein said interactive definition permits establishment of at least one calibration alert selected from a group of alerts including an icon, a logo, an LED, and an email message.

7. An electronic measurement apparatus as recited in claim 4 wherein an alert is defined for each of said at least two periodic calibrations.

8. An electronic measurement apparatus as recited in claim 4 wherein said instrument also includes a display and said alert is presented on the display of said instrument.

9. An electronic measurement apparatus as recited in claim 4 wherein said instrument also includes LEDs and said alert is presented on said LEDs.

10. An electronic measurement apparatus as recited in claim 4 wherein the instrument is connected to a communications network and said alert comprises a message sent over said communications network.

11. A method for managing calibration comprising the steps of:
    providing a calibration component in an instrument for local storage and retrieval of a calibration history in local instrument memory,
    calibrating the instrument with an external calibration system, and
    updating the calibration history in the local instrument memory with calibration verification data relating to the step of calibrating.

12. A method as recited in claim 11 wherein the calibration verification data is a type of data selected from the group consisting of a calibration trace number, calibration data, and an electronic copy of a calibration certificate.

13. A method as recited in claim 11 the calibration component monitoring a current status of at least one periodic calibration of the instrument and displaying a calibration alert when said calibration expires.

14. A method as recited in claim 12 and further comprising defining first and second calibration types, wherein each calibration type is associated with a respective calibration history.

15. A method as recited in claim 13 wherein the alert comprises a message sent over a communications network.

16. A method as recited in claim 15 and further comprising receiving said message and scheduling a calibration for said instrument.

17. An apparatus comprising:
an instrument subject to at least two different periodic calibration types, the instrument having a local instrument processor, and
instructions configured to be executable on the local instrument processor for monitoring and providing an alert regarding a status of each respective periodic calibration type.

* * * * *